US011649346B2

(12) United States Patent
Petrie et al.

(10) Patent No.: US 11,649,346 B2
(45) Date of Patent: *May 16, 2023

(54) COMPOSITIONS CONTAINING DERIVATIZED POLYAMINES

(71) Applicant: BASF SE, Ludwigshafen (DE)

(72) Inventors: Randall Petrie, Charlotte, NC (US); Luke S. Egan, Rock Hill, SC (US); Sridhar G. Iyer, Matthews, NC (US); Armin Burghart, Charlotte, NC (US); Jeremy Funk, Charlotte, NC (US)

(73) Assignee: BASF SE (*) Notice: Subject to any disclaimer, the term of this patent is extended or adjusted under 35 U.S.C. 154(b) by 90 days.

This patent is subject to a terminal disclaimer.

(21) Appl. No.: 16/576,319

(22) Filed: Sep. 19, 2019

(65) Prior Publication Data
US 2020/0087531 A1 Mar. 19, 2020

Related U.S. Application Data

(63) Continuation of application No. 14/436,408, filed as application No. PCT/EP2013/071593 on Oct. 16, 2013, now Pat. No. 10,465,086.

(60) Provisional application No. 61/714,497, filed on Oct. 16, 2012.

(51) Int. Cl.
C08L 33/08 (2006.01)
C08L 79/02 (2006.01)
C09D 133/02 (2006.01)
C09D 179/02 (2006.01)
C09D 133/08 (2006.01)
C08F 220/18 (2006.01)
C09D 133/00 (2006.01)
C08L 33/02 (2006.01)
C09D 143/02 (2006.01)
C08L 33/06 (2006.01)
C09D 133/06 (2006.01)
E04B 1/66 (2006.01)

(52) U.S. Cl.
CPC ........ C08L 33/08 (2013.01); C08F 220/1804 (2020.02); C08L 79/02 (2013.01); C09D 133/00 (2013.01); C09D 133/02 (2013.01); C09D 133/08 (2013.01); C09D 179/02 (2013.01); C08L 33/02 (2013.01); C08L 33/064 (2013.01); C09D 133/064 (2013.01); C09D 143/02 (2013.01); E04B 1/66 (2013.01)

(58) Field of Classification Search
CPC ............... C09D 133/00; C09D 133/02; C09D 133/064; C09D 179/02; C08L 33/02; C08L 33/08; C08L 33/064; C08L 79/02
See application file for complete search history.

(56) References Cited

U.S. PATENT DOCUMENTS

| 4,241,682 A | 12/1980 | Konstandt | |
|---|---|---|---|
| 4,273,833 A * | 6/1981 | De Long | B63B 59/04 106/18.32 |
| 5,705,560 A * | 1/1998 | Takarabe | C09D 133/064 524/556 |
| 5,804,627 A | 9/1998 | Landy | |
| 6,013,721 A | 1/2000 | Schall et al. | |
| 10,465,086 B2 * | 11/2019 | Petrie | C09D 179/02 |
| 2004/0131788 A1 | 7/2004 | Hermes | |
| 2008/0171810 A1 * | 7/2008 | Matthews | C09D 133/08 523/172 |
| 2009/0176127 A1 | 7/2009 | Matthews | |
| 2010/0010134 A1 | 1/2010 | Foerg et al. | |
| 2012/0082859 A1 | 4/2012 | Fessenbecker | |

FOREIGN PATENT DOCUMENTS

| AU | 2013333960 | 10/2013 | |
|---|---|---|---|
| DE | 19917235 | 10/2000 | |
| DE | 19917235 A1 * | 10/2000 | ............... C08K 5/17 |
| JP | H10-60308 | 3/1998 | |
| JP | 2002322431 | 11/2002 | |
| WO | 9622338 | 7/1996 | |
| WO | WO-9622338 A2 * | 7/1996 | ........... C09D 133/06 |
| WO | 2012045712 | 4/2012 | |

OTHER PUBLICATIONS

Polymerdatabase.Com, "Glass transition temperatures" Glass transition temperatures 2022 accessed on Feb. 24, 2022 at http://polymerdatabase.com/polymer%20physics/Polymer%20Tg.html (Year: 2022).*
International Search Report of the EPO Searching Authority in Application No. PCT/EP2013/071593, dated Jul. 1, 2014, 5 pages.
First Examination Report dated Dec. 14, 2017, from New Zealand Application No. 706414, 4 pages.
Substantive Examination Report dated Dec. 1, 2017 for PH Application 1/2015/0500726, 5 pages.

* cited by examiner

Primary Examiner — Ling Siu Choi
Assistant Examiner — David L Miller
(74) Attorney, Agent, or Firm — Faegre Drinker Biddle & Reath LLP

(57) ABSTRACT

Disclosed herein are aqueous coating compositions containing an anionically stabilized polymer, one or more derivatized polyamines, and a volatile base. Coating compositions can farther include one or more additional copolymers, which may or may not be anionically stabilized, and/or additional additives, including pigments, defoamers, pigment dispersing agents, thickeners, surfactants, and combinations thereof. By incorporating a derivatized polyamine, such as an alkoxylated polyamine, the setting time of the coating compositions can be decreased. Also provided are coatings formed from the coating compositions described herein, as well as methods of forming these coatings.

24 Claims, No Drawings

COMPOSITIONS CONTAINING DERIVATIZED POLYAMINES

CROSS-REFERENCE TO RELATED APPLICATIONS

This application is a continuation of U.S. Application No. U.S. Ser. No. 14/436,408, filed Apr. 16, 2015, which is a national phase application filed under 35 U.S.C. § 371 of PCT/EP2013/071593, filed Oct. 16, 2013, which claims the benefit of priority to U.S. Provisional Application No. 61/714,497 filed Oct. 16, 2012, the disclosures of which are expressly incorporated by reference herein in their entireties.

FIELD OF THE DISCLOSURE

The present disclosure relates generally to coating compositions containing derivatized polyamines for use in a variety of applications.

BACKGROUND

The formation of durable, high quality coatings on exterior surfaces poses numerous challenges. Notably, coatings on exterior surfaces typically remain exposed to the elements during application and drying. As a result, weather conditions during coating application and drying can impact the quality of exterior coatings. In particular, rainfall during and/or after coating applications can wash-off some or all of the coating, resulting in coating failure.

By shortening the setting time of coatings, instances of coating failure, such as those due to unanticipated rainfall, can be minimized. Towards this end, additives have been incorporated into coatings to decrease setting time. While coatings containing setting additives do exhibit quick-setting behavior, these coatings suffer from serious drawbacks, including decreased elongation at break and significant yellowing upon weathering. As a result, existing quick-settings coatings have proved unsuitable for many applications.

SUMMARY OF THE DISCLOSURE

Disclosed are quick-setting aqueous coating compositions comprising an anionically stabilized copolymer, a derivatized polyamine, and a volatile base. The coatings exhibit quick setting times upon application to a surface. In addition, the coating compositions are substantially non-yellowing upon weathering, and display suitable physical properties, including sufficient elongation at break, for a wide variety of exterior applications.

The coating compositions contain one or more anionically stabilized polymers. The anionically stabilized polymers can be derived from one or more ethylenically-unsaturated monomers, including (meth)acrylate monomers, vinyl aromatic monomers, ethylenically unsaturated aliphatic monomers, vinyl ester monomers, and combinations thereof. In some embodiments, the anionically stabilized copolymer has a measured $T_g$ of between $-70°$ C. and $25°$ C.

In some instances, the anionically stabilized copolymer is an acrylic-based copolymer that can be derived from: (i) one or more (meth)acrylate monomers; (ii) one or more carboxylic acid-containing monomers; (iii) optionally one or more acetoacetoxy monomers; (iv) optionally one or more phosphorus-containing monomers; and (v) optionally one or more additional ethylenically-unsaturated monomers, excluding monomers (i), (ii), (iii), and (iv). In certain embodiments, the anionically stabilized copolymer is derived from greater than 80% by weight of one or more (meth)acrylate monomers, such as methyl methacrylate, butyl acrylate, 2-ethylhexylacrylate, and combinations thereof. In some embodiments, the anionically stabilized copolymer is derived from greater than 0% by weight to 5% by weight of one or more carboxylic acid-containing monomers, such as acrylic acid, methacrylic acid, itaconic acid, maleic acid, fumaric acid, and combinations thereof. In certain embodiments, the anionically stabilized copolymer is derived from greater than 0% by weight to 35% by weight of one or more additional ethylenically-unsaturated monomers, such as styrene, acrylamide, and combinations thereof.

The coating compositions also contain a derivatized polyamine, such as a derivatized polyalkyleneimine, a derivatized polyvinylamine, or a combination thereof. Exemplary derivatized polyamines include alkoxylated polyamines derived from ethylene oxide, propylene oxide, butylene oxide, and combinations thereof.

Suitable derivatized polyamines can possess a variety of molecular weights and degrees of nitrogen-derivatization. For example, the derivatized polyamine can have an average molecular weight of between 5,000 and 5,000,000 Daltons and/or a degree of nitrogen-derivatization between 5% and 100%. In some embodiments, the derivatized polyamine is present in the coating composition at between 0.1% by weight and 5% by weight, based on the dry weight of the anionically stabilized copolymer.

The coating compositions also contain a volatile base. Exemplary volatile bases include, but are not limited to, ammonia, lower alkylamines such as dimethylamine and diethylamine, ethanolamine, morpholine, aminopropanol, 2-amino-2-methyl-1-propanol, 2-dimethylaminoethanol, and combinations thereof. In certain embodiments, the volatile base is ammonia.

Coating compositions can further contain an additional polymer. The additional polymer can be, for example, a polymer or copolymer derived from one or more (meth) acrylate monomers, vinyl aromatic monomers, ethylenically unsaturated aliphatic monomers, vinyl ester monomers, and combinations thereof. The coating compositions can also include one or more additives, including pigments, fillers, dispersants, coalescents, pH neutralizing agents, plasticizers, defoamers, surfactants, thickeners, biocides, co-solvents, and combinations thereof.

Also provided are coatings formed from the coating compositions described herein, as well as methods of forming these coatings. Generally, coatings are formed by applying a coating composition described herein to a surface, and allowing the coating to dry to form a coating. The resultant dry coatings typically comprise, at minimum, an anionically stabilized polymer and a derivatized polyamine. The dry coatings can further comprise one or more additional polymers and/or additives as described above. The coating thickness can vary depending upon the application of the coating. In some embodiments, the coating has a dry thickness of between 10 mils and 100 mils. In certain embodiments, the coating has a tensile strength of greater than 200 psi after a drying period of 14 days at room temperature, according to ASTM D-2370, and/or an elongation at break of greater than 100% after a drying period of 14 days at room temperature, according to ASTM D-2370. In some embodiments, the coating has a tensile strength of greater than 200 psi, and an elongation at break of greater than 100%, according to ASTM D-2370, after 1,000 hours of accelerated weathering.

The coating compositions can be applied to a variety of surfaces including, but not limited to metal, asphalt, concrete, stone, ceramic, wood, plastic, polymer, polyurethane foam, glass, and combinations thereof. The coating compositions can be applied to interior or exterior surfaces. In certain embodiments, the surface is an architectural surface, such as a roof, wall, floor, or combination thereof.

The details of one or more embodiments are set forth in the description below. Other features, objects, and advantages will be apparent from the description and from the claims.

DETAILED DESCRIPTION

As used herein, the term "(meth)acrylate monomer" includes acrylate, methacrylate, diacrylate, and dimethacrylate monomers.

The coating compositions described herein contain one or more anionically stabilized polymers. Suitable anionically stabilized polymers include copolymers derived from one or more ethylenically-unsaturated monomers. Exemplary ethylenically-unsaturated monomers include (meth)acrylate monomers, vinyl aromatic monomers (e.g., styrene), ethylenically unsaturated aliphatic monomers (e.g., butadiene), vinyl ester monomers (e.g., vinyl acetate), and combinations thereof. In some embodiments, the anionically stabilized polymers can include pure acrylic copolymers, styrene acrylic copolymers, vinyl acrylic copolymers, or carboxylated or non-carboxylated styrene butadiene copolymers.

In some embodiments, the anionically stabilized polymer includes an acrylic-based copolymer. Acrylic-based copolymers include copolymers derived from one or more (meth)acrylate monomers. The acrylic-based copolymer can be a pure acrylic polymer (i.e., a polymer or copolymer derived exclusively from (meth)acrylate monomers), a styrene-acrylic polymer (i.e., a copolymer derived from styrene and one or more (meth)acrylate monomers), or a vinyl-acrylic polymer (i.e., a copolymer derived from one or more vinyl ester monomers and one or more (meth)acrylate monomers).

In some instances, the acrylic-based copolymer includes:
(i) one or more (meth)acrylate monomers;
(ii) one or more carboxylic acid-containing monomers;
(iii) optionally one or more acetoacetoxy monomers;
(iv) optionally one or more phosphorus-containing monomers; and
(v) optionally one or more additional ethylenically-unsaturated monomers, excluding monomers (i), (ii), (iii), and (iv).

The acrylic-based copolymer can be derived from greater than 55% by weight or greater of one or more (meth)acrylate monomers (e.g., 65% by weight or greater, 75% by weight or greater, 80% by weight or greater, 85% by weight or greater, 88% by weight or greater, 90% by weight or greater, 91% by weight or greater, 92% by weight or greater, 93% by weight or greater, 94% by weight or greater, or 95% by weight or greater of the (meth)acrylate monomer) based on the total weight of monomers. In some embodiments, the (meth)acrylate monomer can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols).

Exemplary acrylate and (meth)acrylate monomers include, but are not limited to, methyl acrylate, methyl (meth)acrylate, ethyl acrylate, ethyl (meth)acrylate, butyl acrylate, butyl (meth)acrylate, isobutyl (meth)acrylate, n-hexyl (meth)acrylate, ethylhexyl (meth)acrylate, n-heptyl (meth)acrylate, ethyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth)acrylate, isodecyl (meth)acrylate, dodecyl (meth) acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth) acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono (meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth) acrylate, 3,4-epoxycyclohexylmethyl (meth)acrylate, 1,6 hexanediol di(meth)acrylate, 1,4 butanediol di(meth)acrylate and combinations thereof.

In certain instances, the acrylic-based copolymer is derived from two or more, three or more, or four or more (meth)acrylate monomers. In certain embodiments, the acrylic-based copolymer is derived from at least two (meth) acrylate monomers, wherein at least one of the (meth) acrylate monomers has a $T_g$ for its corresponding homopolymer of 80° C. or greater (e.g., 90° C. or greater, 100° C. or greater, or 105° C. or greater) (e.g., methyl methacrylate) and at least one of the (meth)acrylate monomers has a $T_g$ for its corresponding homopolymer of 0° C. or less (e.g., −10° C. or less, −20° C. or less, −30° C. or less, −40° C. or less, or −50° C. or less) (e.g., butyl acrylate and/or 2-ethyl hexyl acrylate).

In particular embodiments, the acrylic-based copolymer is derived from one or more (meth)acrylate monomers selected from the group consisting of methyl methacrylate, butyl acrylate, 2-ethylhexylacrylate, and combinations thereof.

The acrylic-based copolymer can be derived from greater than 0% by weight to 5% by weight of one or more carboxylic acid-containing monomers based on the total weight of monomers. Exemplary carboxylic-acid monomers include, but are not limited to, α,β-monoethylenically unsaturated mono- and dicarboxylic acids, such as acrylic acid, methacrylic acid, itaconic acid, crotonic acid, maleic acid, fumaric acid, dimethacrylic acid, ethylacrylic acid, allylacetic acid, vinylacetic acid, mesaconic acid, methylenemalonic acid, citraconic acid, and combinations thereof. In certain embodiments, the acrylic-based copolymer is derived from greater than 0% by weight to 5% by weight, or greater than 0% by weight to 2.5% by weight, acrylic acid, methacrylic acid, or combinations thereof.

The acrylic-based copolymer can be derived from greater than 0% by weight to 5% by weight of one or more phosphorus-containing monomers. Examples of suitable phosphorus-containing monomers include dihydrogen phosphate esters of alcohols in which the alcohol contains a polymerizable vinyl or olefenic group, allyl phosphate, phosphoalkyl(meth)acrylates such as 2-phosphoethyl(meth) acrylate (PEM), 2-phosphopropyl(meth)acrylate, 3-phosphopropyl (meth)acrylate, and phosphobutyl(meth)acrylate, 3-phospho-2-hydroxypropyl(meth)acrylate, mono- or di-phosphates of bis(hydroxymethyl) fumarate or itaconate; phosphates of hydroxyalkyl(meth)acrylate, 2-hydroxyethyl (meth)acrylate, 3-hydroxypropyl(meth)acrylate, ethylene oxide condensates of (meth)acrylates, $H_2C{=}C(CH_3)COO$ $(CH_2CH_2O)_nP(O)(OH)_2$, and analogous propylene and butylene oxide condensates, where n is an amount of 1 to 50, phosphoalkyl crotonates, phosphoalkyl maleates, phosphoalkyl fumarates, phosphodialkyl (meth)acrylates, phosphodialkyl crotonates, vinyl phosphonic acid, allyl phosphonic acid, 2-acrylamido-2methylpropanephosphinic acid, α-phosphonostyrene, 2-methylacrylamido-2-methylpropanephosphinic acid, (hydroxy)phosphinylalkyl(meth)acrylates, (hydroxy)phosphinylmethyl methacrylate, and combinations thereof. In certain embodiments, the acrylic-based copolymer is derived from greater than 0% by weight to 2.5% by weight of one or more phosphorus-containing monomers. In particular embodiments, the acrylic-based copolymer is derived from greater than 0% by weight to 5% by weight, or greater than 0% by weight to 3% by weight 2-phosphoethyl methacrylate (PEM).

The acrylic-based copolymer can be derived from greater than 0% by weight to 5% by weight of one or more acetoacetoxy monomers. Suitable acetoacetoxy monomers include acetoacetoxyalkyl (meth)acrylates, such as acetoacetoxyethyl (meth)acrylate (AAEM), acetoacetoxypropyl (meth)acrylate, acetoacetoxybutyl (meth)acrylate, and 2,3-di(acetoacetoxy)propyl (meth)acrylate; allyl acetoacetate; vinyl acetoacetate; and combinations thereof. In certain embodiments, the acrylic-based copolymer is derived from greater than 0% to 10% or from 0.5% to 5% by weight of one or more acetoacetoxy monomers.

The acrylic-based copolymer can be derived from greater than 0% by weight to 35% by weight of one or more additional ethylenically-unsaturated monomers. For example, the acrylic-based copolymer can further include a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, or a combination of these monomers.

Suitable vinyl aromatic compounds include styrene, α- and p-methylstyrene, α-butylstyrene, 4-n-butylstyrene, 4-n-decylstyrene, vinyltoluene, and combinations thereof. Vinyl esters of carboxylic acids having comprising up to 20 carbon atoms include, for example, vinyl laurate, vinyl stearate, vinyl propionate, versatic acid vinyl esters, vinyl acetate, and combinations thereof. The vinyl halides can include ethylenically unsaturated compounds substituted by chlorine, fluorine or bromine, such as vinyl chloride and vinylidene chloride. The vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 4 to 8 carbon atoms and two olefinic double bonds, such as butadiene, isoprene, and chloroprene. Silane containing monomers can include, for example, vinyl silanes, such as vinyltrimethoxysilane, vinyltriethoxysilane (VTEO), vinyl tris(2-methoxyethoxysilane), and vinyl triisopropoxysilane, and (meth)acrylatoalkoxysilanes, such as (meth)acryloyloxypropyltrimethoxysilane, γ-(meth)acryloxypropyltrimethoxysilane, and γ-(meth)acryloxypropyltriethoxysilane. (Meth)acrylamide derivatives include, for example, keto-containing amide functional monomers defined by the general structure below

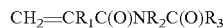

$CH_2=CR_1C(O)NR_2C(O)R_3$ wherein $R_1$ is hydrogen or methyl; $R_2$ is hydrogen, a $C_1$-$C_4$ alkyl group, or a phenyl group; and $R_3$ is hydrogen, a $C_1$-$C_4$ alkyl group, or a phenyl group. For example, the (meth) acrylamide derivative can be diacetone acrylamide (DAAM) or diacetone methacrylamide. Sulfur-containing monomers include, for example, sulfonic acids and sulfonates, such as vinylsulfonic acid, 2-sulfoethyl methacrylate, sodium styrenesulfonate, 2-sulfoxyethyl methacrylate, vinyl butylsulfonate, sulfones such as vinylsulfone, sulfoxides such as vinylsulfoxide, and sulfides such as 1-(2-hydroxyethylthio) butadiene. When present, the sulfur-containing monomers are generally present in an amount greater than 0% by weight to 5% by weight.

In some cases, the coating composition comprises an acrylic-based copolymer derived from:
(i) 10-15% by weight methyl methacrylate;
(ii) 50-70% by weight butyl acrylate;
(iii) 15-30% by weight 2-ethylhexylacrylate;
(iv) greater than 0 to 5% by weight carboxylic acid-containing monomers;
(v) 0-5% by weight acrylamide;
(vi) 0-5% by weight acetoacetoxy monomers; and
(vii) 0-5% by weight phosphorus-containing monomers.

In some cases, the coating composition comprises an acrylic-based copolymer derived from:
(i) 55-75% by weight butyl acrylate;
(ii) 0-25% by weight 2-ethylhexylacrylate;
(iii) 10-35% by weight styrene;
(iv) greater than 0 to 5% by weight carboxylic acid-containing monomers;
(v) 0-5% by weight acrylamide;
(vi) 0-5% by weight acetoacetoxy monomers; and
(vii) 0-5% by weight phosphorus-containing monomers.

In some embodiments, the anionically stabilized polymer includes a styrene-butadiene copolymer. The styrene-butadiene copolymer can be carboxylated (i.e., further derived from one or more carboxylic acid-containing monomers) or can be non-carboxylated.

The anionically stabilized polymer can have a glass-transition temperature ($T_g$), as measured by differential scanning calorimetry (DSC) using the mid-point temperature using as described, for example, in ASTM 3418/82, of between −70° C. and 25° C. In certain instances, the anionically stabilized copolymer has a measured $T_g$ of greater than −70° C. (e.g., greater than −60° C., greater than −50° C., greater than −40° C., greater than −30° C., greater than −20° C., greater than −10° C., or greater than 0° C.). In some cases, the anionically stabilized copolymer has a measured $T_g$ of less than 15° C. (e.g., less than 10° C., less than 0° C., less than −10° C., less than −20° C., less than −30° C., less than −40° C., less than −50° C., or less than −60° C.). In certain embodiments, the anionically stabilized copolymer has a measured $T_g$ of between −60° C. and 15° C., −55° C. and 10° C., or −50° C. and 0° C. In some embodiments, the anionically stabilized polymer can have a $T_g$ of from 25° C. to 80° C. In these embodiments, the coating composition can further comprise a coalescing agent suitable to depress the $T_g$ of the anionically stabilized polymer into the film forming range.

The anionically stabilized polymer can be prepared by heterophase polymerization techniques, including, for example, free-radical emulsion polymerization, suspension polymerization, and mini-emulsion polymerization. In some examples, the anionically stabilized polymer is prepared by polymerizing the monomers using free-radical emulsion polymerization. The emulsion polymerization temperature can range from 10° C. to 130° C. or from 50° C. to 90° C.

The polymerization medium can include water alone or a mixture of water and water-miscible liquids, such as methanol, ethanol or tetrahydrofuran. In some embodiments, the polymerization medium is free of organic solvents and includes only water.

The emulsion polymerization can be carried out as a batch process, as a semi-batch process, or in the form of a continuous process. In some embodiments, a portion of the monomers can be heated to the polymerization temperature and partially polymerized, and the remainder of the monomer batch can be subsequently fed to the polymerization zone continuously, in steps, or with superposition of a concentration gradient. In some embodiments, the copolymer is produced in a single stage (i.e., does not include separate feeds having different monomer compositions so as to produce a multistage polymer particle such as a core/shell particle).

The emulsion polymerization can be performed with a variety of auxiliaries, including water-soluble initiators and regulators. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Reduction-oxidation (redox) initiator systems are also suitable as initiators for the emulsion polymerization. The redox initiator systems are composed of at least one, usually inorganic, reducing agent and one organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems can be used in the company of soluble metal compounds whose metallic component is able to exist in a plurality of valence states. Typical redox initiator systems include, for example, ascorbic acid/iron(II) sulfate/sodium peroxodisulfate, tert-butyl hydroperoxide/sodium di sulfite, tert-butyl hydroperoxide/Na hydroxymethanesulfinate, or tert-butyl hydroperoxide/ascorbic acid. The individual components, the reducing component for example, can also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. The concentration can be 0.1% to 30%, 0.5% to 20%, or 1.0% to 10%, by weight, based on the solution. The amount of the initiators is generally 0.1% to 10% or 0.5% to 5% by weight, based on the monomers to be polymerized. It is also possible for two or more different initiators to be used in the emulsion polymerization. For the removal of the residual monomers, an initiator can be added after the end of the emulsion polymerization.

In the polymerization it is possible to use molecular weight regulators or chain transfer agents, in amounts, for example, of 0 to 0.8 parts by weight, based on 100 parts by weight of the monomers to be polymerized, to reduce the molecular weight of the copolymer. Suitable examples include compounds having a thiol group such as tert-butyl mercaptan, thioglycolic acid ethylacrylic esters, mercaptoethanol, mercaptopropyltrimethoxysilane, and tert-dodecyl mercaptan. Additionally, it is possible to use regulators without a thiol group, such as terpinolene. In some embodiments, the emulsion polymer is prepared in the presence of greater than 0% to 0.5% by weight, based on the monomer amount, of at least one molecular weight regulator. In some embodiments, the emulsion polymer is prepared in the presence of less than less than 0.3% or less than 0.2% by weight (e.g., 0.10% to 0.15% by weight) of the molecular weight regulator.

Dispersants, such as surfactants, can also be added during polymerization to help maintain the dispersion of the monomers in the aqueous medium. For example, the polymerization can include less than 3% by weight or less than 1% by weight of surfactants. In some embodiments, the polymerization is substantially free of surfactants and can include less than 0.05% or less than 0.01% by weight of one or more surfactants.

Anionic and nonionic surfactants can be used during polymerization. Suitable surfactants include ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers include, for example, compounds having at least one amino group or ammonium group and at least one $C_8$-$C_{22}$ alkyl group.

The coating compositions described herein further contain one or more derivatized polyamines. The derivatized polyamine functions as a setting agent, and decreases the setting time of the coating compositions.

Polyamines are compounds which contain a plurality of primary amine groups, secondary amine groups, or combinations thereof. Generally, the polyamine contains at least three primary amine groups, secondary amine groups, or combinations thereof. For example, the polyamine can contain at least 5 primary and/or secondary amine groups, at least 10 primary and/or secondary amine groups, at least 15 primary and/or secondary amine groups, at least 20 primary and/or secondary amine groups, at least 25 primary and/or secondary amine groups, at least 50 primary and/or secondary amine groups, or more. The polyamines can optionally further contain one or more tertiary amine groups.

The polyamine can be a polymer or copolymer derived from one or more monomers containing an amine group. Suitable monomers of this type include vinylamine, allylamine, and ethyleneimine. Other suitable amino-containing monomers include (meth)acrylate monomers containing one or more primary and/or secondary amine groups, such as 2-aminoethyl methacrylate, 2-aminoethyl acrylate, 2-(tert-butylamino)ethyl acrylate, 2-(tert-butylamino)ethyl methacrylate. In some embodiments, the polyamine is an acrylic polymer derived from one or more monomers comprising an amino group.

Derivatized polyamines as used herein are polyamines that are N-derivatized such that one or more amine nitrogens have been derivatized (i.e., some number of the primary and/or secondary amine groups within the polyamine have been covalently modified to replace one or more hydrogen atoms in the primary and/or secondary amine groups with a non-hydrogen moiety). For example, in the case of polyamines containing one or more primary amine groups, derivatized polyamines can include polyamines where at least a portion of the primary amine groups have been converted to either secondary or tertiary amine groups. In the case of polyamines containing one or more secondary amine groups, derivatized polyamines can include polyamines where at least a portion of the secondary amine groups have been converted to tertiary amines.

Suitable derivatized polyamines are known in the art, and include polyamines in which some number of the primary and/or secondary amine groups have been covalently modified to replace one or more hydrogen atoms with a non-hydrogen moiety (R). In some embodiments, each R within the derivatized polyamine is individually selected from the group consisting of a C1-6 alkyl group, optionally substituted with one or more hydroxyl groups; an acyl group ($-COR_1$), wherein $R_1$ is a C1-C6 alkyl group or a C5-C7 aryl or heteroaryl group, optionally substituted with one or more hydroxyl groups; ($-COOR_2$), wherein $R_2$ is a C1-C6 alkyl group or a C5-C7 aryl or heteroaryl group, optionally substituted with one or more hydroxyl groups; ($-SO_2R_3$), wherein $R_3$ is a C1-C6 alkyl group or a C5-C7 aryl or heteroaryl group, optionally substituted with one or more hydroxyl groups, and a poly(alkylene oxide) group. The R groups present within a derivatized polyamine can be selected such that the derivatized polyamine possesses a hydrophilicity which renders the derivatized polyamine compatible with the aqueous compositions described herein. For example, the R groups within the derivatized polyamine can be selected such that the derivatized polyamine is water soluble or water dispersible. In some embodiments, at least 50% of the derivatized amine groups are alkoxylated amine groups.

In some embodiments, the derivatized polyamine includes alkoxylated polyamine groups. Suitable alkoxylated polyamines include alkoxylated polyamines derived from 2 to 8 carbon alkylene oxides. In certain instances, the alkoxylated polyamine is derived from ethylene oxide, propylene oxide, butylene oxide, or combinations thereof. In particular embodiments, the alkoxylated polyamine is an alkoxylated polyalkyleneimine, an alkoxylated polyvinylamine, or a combination thereof. Suitable alkoxylated polyvinylamines include those described in U.S. Pat. No. 7,268,199 to Andre, et al., which is incorporated herein by reference for its teaching of alkoxylated polyvinylamines. Suitable alkoxylated polyalkyleneimines, as well as methods of making thereof, are also known in the art. See, for example, U.S. Pat. No. 7,736,525 to Thankachan, et al., U.S. Pat. No. 6,811,601 to Borzyk, et al., and WO 99/67352, all of which are incorporated herein by reference for their teaching of alkoxylated polyalkyleneimines. Suitable alkoxylated polyamines also include, for example, those described in U.S. Pat. No. 8,193,144 to Tanner, et al., which is incorporated herein by reference for the alkoxylated polyamines described therein. In particular embodiments, the composition contains an ethoxylated polyethyleneimine, a propoxylated polyethyleneimine, a butoxylated polyethyleneimine, or a combination thereof.

In some embodiments, the derivatized polyamine includes an alkylated polyalkyleneimine (e.g., an alkylated polyethyleneimine or an alkylated polyvinylamine), a hydroxyalkylated polyalkyleneimine (e.g., a hydroxalkylated polyethyleneimine or a hydroxyalkylated polyvinylamine), an acylated polyalkyleneimine (e.g., an acylated polyethyleneimine or an acylated polyvinylamine), or a combination thereof.

Derivatized polyamines are generally incorporated into the compositions in amounts less than 10% by weight, based on the dry weight of the anionically stabilized copolymer. The amount of derivatized polyamine present in the composition can be selected in view of the identity of the derivatized polyamine, the nature of the anionically stabilized copolymer present in the composition, and the desired setting time of the composition.

In some instances, the derivatized polyamine is present in an amount greater than 0.05% by weight, greater than 0.1% by weight, greater than 0.15% by weight, greater than 0.20% by weight, greater than 0.25% by weight, greater than 0.3% by weight, greater than 0.4% by weight, greater than 0.5% by weight, greater than 0.6% by weight, greater than 0.7% by weight, greater than 0.8% by weight, greater than 0.9% by weight, greater than 1.0% by weight, greater than 1.25% by weight, greater than 1.5% by weight, greater than 2% by weight, or greater than 2.5% by weight. In some instances, the derivatized polyamine is present in an amount less than 8% by weight, less than 7.5% by weight, less than 6% by weight, less than 5% by weight, less than 4.5% by weight, less than 4% by weight, less than 3.5% by weight, less than 3% by weight, less than 2.5% by weight, less than 2% by weight, less than 1.5% by weight, less than 1% by weight, or less than 0.5% by weight.

In some embodiments, the derivatized polyamine is present in the composition at between 0.1% by weight and 5% by weight, based on the dry weight of the anionically stabilized copolymer. In certain embodiments, the derivatized polyamine is present in the composition at between 0.5% by weight and 2.5% by weight, based on the dry weight of the anionically stabilized copolymer.

Derivatized polyamines having a range of molecular weights and degrees of nitrogen-derivatization can be incorporated into the coating compositions. The setting time of the composition, as well as the physical properties of the resultant coating, can be varied by selection of the loading level, molecular weight, microstructure (e.g., degree of branching), and the degree of nitrogen-derivatization of the derivatized polyamine. The setting time of the composition, as well as the physical properties of the resultant coating, can also be influenced by ambient conditions during coating application and drying, including humidity and temperature. In some embodiments, a particular derivatized polyamine is incorporated into the coating composition at a particular loading level in view of ambient conditions, including humidity and temperature, to achieve a coating having a desired setting time, desired physical properties, or a combination thereof.

In some embodiments, the derivatized polyamine has an average molecular weight of greater than 500 Daltons, greater than 1,000 Daltons, greater than 2,500 Daltons, greater than 5,000 Daltons, greater than 10,000 Daltons, greater than 15,000 Daltons, greater than 20,000 Daltons, greater than 25,000 Daltons, greater than 30,000 Daltons, greater than 35,000 Daltons, greater than 40,000 Daltons, greater than 50,000 Daltons, greater than 60,000 Daltons, greater than 70,000 Daltons, greater than 80,000 Daltons, greater than 90,000 Daltons, or greater than 100,000 Daltons. The derivatized polyamine can have an average molecular weight of less than 5,000,000 Daltons, less than 2,500,000, less than 1,000,000, less than 750,000 Daltons, 550,000 Daltons, less than 500,000 Daltons, less than 450,000 Daltons, less than 400,000 Daltons, less than 350,000 Daltons, less than 300,000 Daltons, less than 350,000 Daltons, less than 300,000 Daltons, less than 250,000 Daltons, less than 200,000 Daltons, less than 175,000 Daltons, less than 150,000 Daltons, less than 125,000 Daltons, or less than 100,000 Daltons. In certain embodiments, the derivatized polyamine has an average molecular weight of between 5,000 and 5,000,000 Daltons, of between 5,000 Daltons and 500,000 Daltons, or between 40,000 and 150,000 Daltons.

Generally, the derivatized polyamine will have a degree of nitrogen-derivatization, defined as the percentage of available nitrogens within the polyamine that have been covalently modified to replace one or more hydrogen atoms with a non-hydrogen moiety, of at least 5%. In certain embodiments, the derivatized polyamine has a degree of nitrogen-derivization of at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, or at least 90%. In certain embodiments, the derivatized polyamine has a degree of nitrogen-derivatization of less than 99%, less than 98%, less than 97%, less than 95%, less than 90%, less than 85%, less than 80%, or less than 75%.

In some embodiments, the derivatized polyamine has a degree of nitrogen-derivatization between 5% and 100%. In certain embodiments, the derivatized polyamine has a degree of nitrogen-derivatization between 50% and 95% or between 70% and 90%. In embodiments where the derivatized polyamine is an alkoxylated polyamine, the degree of nitrogen-derivatization can be referred to as the degree of nitrogen alkoxylation, defined as the percentage of available nitrogens within the polyamine that have been converted to a corresponding hydroxyalkyl group.

The quick-setting coating compositions described herein also contain a volatile base. Volatile bases are basic substances that are soluble in water, remain in the aqueous coating composition under normal storage conditions, and evaporate from the aqueous coating composition under suitable drying conditions.

Generally, one or more volatile bases are incorporated in the composition in an effective amount to maintain the pH of the coating composition in the range of from 7.5 to 12.5 or in the range from 9 to 11. In some embodiments, one or more volatile bases are incorporated in the composition at between 0.1% by weight and 5.0% by weight. In certain embodiments, one or more volatile bases are incorporated in the composition at between 0.5% by weight and 2.5% by weight.

Suitable volatile bases can be selected on the basis of several factors, including their basicity and volatility. Exemplary volatile bases include, but are not limited to, ammonia, lower alkylamines such as dimethylamine, triethylamine, and diethylamine, ethanolamine, diethanolamine, triethanolamine, morpholine, aminopropanol, 2-amino-2-methyl-1-propanol, 2-dimethylaminoethanol, and combinations thereof. In certain embodiments, the volatile base is ammonia. In some cases, ammonia is the sole volatile base present in the coating composition. Alternatively, ammonia can be incorporated in admixture with other volatile bases, non-volatile bases, such as alkali metal hydroxides, or combinations thereof.

In some embodiments, the composition can further contain an additional polymer, which may or may not be anionically stabilized. The additional polymer can be, for example, a polymer or copolymer derived from the monomers described herein.

When present, the additional polymer is typically present in an amount greater than 0% by weight to 15% by weight, based on the weight of the anionically stabilized copolymer. In some instances, the additional polymer is present in an amount less than 10% by weight, less than 7.5% by weight, less than 5% by weight, less than 2.5% by weight, less than 2% by weight, less than 1.5% by weight, or less than 1% by weight, based on the weight of the anionically stabilized copolymer. When present, the additional polymer is generally present in an amount greater than 0.05% by weight, greater than 0.1% by weight, greater than 0.25% by weight, greater than 0.5% by weight, greater than 0.75% by weight, greater than 1.0% by weight, greater than 1.5% by weight, or greater than 2.5% by weight, based on the weight of the anionically stabilized copolymer. In some embodiments, the additional copolymer is present in the composition at between 0.1% by weight and 10% by weight, based on the weight of the anionically stabilized copolymer.

In some embodiments, the additional polymer can include a polymer having a $T_g$ of between −70° C. and 60° C. In some cases, the additional polymer has a measured $T_g$ of greater than −70° C. (e.g., greater than −60° C., greater than −50° C., greater than −40° C., greater than −30° C., greater than −20° C., greater than −10° C., greater than 0° C., greater than 10° C., greater than 20° C., or greater than 30° C.). In certain instances, the additional polymer has a measured $T_g$ of less than 60° C. (e.g., less than 50° C., less than 40° C., less than 30° C., less than 20° C., less than 10° C., less than 0° C., less than −10° C., less than −20° C., less than −30° C., less than −40° C., or less than −50° C.). In some instances, the additional polymer has a measured $T_g$ of between −70° C. and 50° C. In certain instances, the additional polymer has a $T_g$ of between −20° C. and 50° C. In some embodiments, the additional copolymer has a $T_g$ of greater than 60° C. or less than −70° C.

In some embodiments, the additional polymer has a $T_g$ that is greater than the $T_g$ of the anionically stabilized copolymer. For example, the additional polymer can have a measured $T_g$ that is 5° C. or greater, 10° C. or greater, 15° C. or greater, 20° C. or greater, 25° C. or greater, 30° C. or greater, 35° C. or greater, 40° C. or greater, 45° C. or greater, or 50° C. or greater than the measured $T_g$ of the anionically stabilized copolymer.

The aqueous coating compositions can further include one or more additives, including pigments, fillers, dispersants, coalescents, pH modifying agents, plasticizers, defoamers, surfactants, thickeners, biocides, co-solvents, and combinations thereof. The choice of additives in the composition will be influenced by a number of factors, including the nature of the acrylic polymer dispersion and the intended use of the coating composition.

Examples of suitable pigments include metal oxides, such as titanium dioxide, zinc oxide, iron oxide, or combinations thereof. In certain embodiments, the composition includes a titanium dioxide pigment. Examples of commercially titanium dioxide pigments are KRONOS® 2101, KRONOS® 2310, available from Kronos WorldWide, Inc. (Cranbury, N.J.), TI-PURE® R-900, available from DuPont (Wilmington, Del.), or TIONA® AT1 commercially available from Millenium Inorganic Chemicals. Titanium dioxide is also available in concentrated dispersion form. An example of a titanium dioxide dispersion is KRONOS® 4311, also available from Kronos WorldWide, Inc.

Examples of suitable fillers include calcium carbonate, nepheline syenite, (25% nepheline, 55% sodium feldspar, and 20% potassium feldspar), feldspar (an aluminosilicate), diatomaceous earth, calcined diatomaceous earth, talc (hydrated magnesium silicate), aluminosilicates, silica (silicon dioxide), alumina (aluminum oxide), clay, (hydrated aluminum silicate), kaolin (kaolinite, hydrated aluminum silicate), mica (hydrous aluminum potassium silicate), pyrophyllite (aluminum silicate hydroxide), perlite, baryte (barium sulfate), Wollastonite (calcium metasilicate), and combinations thereof. In certain embodiments, the composition comprises a calcium carbonate filler.

Examples of suitable dispersants are polyacid dispersants and hydrophobic copolymer dispersants. Polyacid dispersants are typically polycarboxylic acids, such as polyacrylic acid or polymethacrylic acid, which are partially or completely in the form of their ammonium, alkali metal, alkaline earth metal, ammonium, or lower alkyl quaternary ammonium salts. Hydrophobic copolymer dispersants include copolymers of acrylic acid, methacrylic acid, or maleic acid with hydrophobic monomers. In certain embodiments, the composition includes a polyacrylic acid-type dispersing agent, such as Pigment Disperser N, commercially available from BASF SE.

Suitable coalescents, which aid in film formation during drying, include ethylene glycol monomethyl ether, ethylene glycol monobutyl ether, ethylene glycol monoethyl ether acetate, ethylene glycol monobutyl ether acetate, diethylene glycol monobutyl ether, diethylene glycol monoethyl ether acetate, dipropylene glycol monomethyl ether, 2,2,4-trimethyl-1,3-pentanediol monoisobutyrate, and combinations thereof.

Examples of suitable thickening agents include hydrophobically modified ethylene oxide urethane (HEUR) polymers, hydrophobically modified alkali soluble emulsion (HASE) polymers, hydrophobically modified hydroxyethyl celluloses (HMHECs), hydrophobically modified polyacrylamide, and combinations thereof. HEUR polymers are linear reaction products of diisocyanates with polyethylene oxide end-capped with hydrophobic hydrocarbon groups. HASE polymers are homopolymers of (meth)acrylic acid, or copolymers of (meth)acrylic acid, (meth)acrylate esters, or maleic acid modified with hydrophobic vinyl monomers. HMHECs include hydroxyethyl cellulose modified with hydrophobic alkyl chains. Hydrophobically modified polyacrylamides include copolymers of acrylamide with acrylamide modified with hydrophobic alkyl chains (N-alkyl acrylamide). In certain embodiments, the coating composition includes a hydrophobically modified hydroxyethyl cellulose thickener.

Examples of suitable pH modifying agents include amino alcohols, monoethanolamine (MEA), diethanolamine (DEA), 2-(2-aminoethoxy)ethanol, diisopropanolamine (DIPA), 1-amino-2-propanol (AMP), ammonia, and combinations thereof.

Defoamers serve to minimize frothing during mixing and/or application of the coating composition. Suitable defoamers include silicone oil defoamers, such as polysiloxanes, polydimethylsiloxanes, polyether modified polysiloxanes, and combinations thereof. Exemplary silicone-based defoamers include BYK®-035, available from BYK USA Inc. (Wallingford, Conn.), the TEGO® series of defoamers, available from Evonik Industries (Hopewell, Va.), and the DREWPLUS® series of defoamers, available from Ashland Inc. (Covington, Ky.).

Suitable surfactants include nonionic surfactants and anionic surfactants. Examples of nonionic surfactants are alkylphenoxy polyethoxyethanols having alkyl groups of about 7 to about 18 carbon atoms, and having from about 6 to about 60 oxyethylene units; ethylene oxide derivatives of long chain carboxylic acids; analogous ethylene oxide condensates of long chain alcohols, and combinations thereof. Exemplary anionic surfactants include ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and combinations thereof. In certain embodiments, the composition comprises a nonionic alkylpolyethylene glycol surfactant, such as LUTENSOL® TDA 8 or LUTENSOL® AT-18, commercially available from BASF SE. In certain embodiments, the composition comprises an anionic alkyl ether sulfate surfactant, such as DISPONIL® FES 77, commercially available from BASF SE. In certain embodiments, the composition comprises an anionic diphenyl oxide disulfonate surfactant, such as CALFAX® DB-45, commercially available from Pilot Chemical.

Suitable biocides can be incorporated to inhibit the growth of bacteria and other microbes in the coating composition during storage. Exemplary biocides include 2-[(hydroxymethyl)amino]ethanol, 2-[(hydroxymethyl) amino]2-methyl-1-propanol, o-phenylphenol, sodium salt, 1,2-benzisothiazolin-3-one, 2-methyl-4-isothiazolin-3-one (MIT), 5-chloro2-methyland-4-isothiazolin-3-one (CIT), 2-octyl-4-isothiazolin-3-one (OIT), 4,5-dichloro-2-n-octyl-3-isothiazolone, as well as acceptable salts and combinations thereof. Suitable biocides also include mildewcides that inhibit the growth mildew or its spores in the coating. Examples of mildeWcides include 2-(thiocyanomethylthio) benzothiazole, 3-iodo-2-propynyl butyl carbamate, 2,4,5,6-tetrachloroisophthalonitrile, 2-(4-thiazolyl)benzimidazole, 2-N-octyl4-isothiazolin-3-one, diiodomethyl p-tolyl sulfone, as well as acceptable salts and combinations thereof. In certain embodiments, the coating composition contains 1,2-benzisothiazolin-3-one or a salt thereof. Biocides of this type include PROXEL® BD20, commercially available from Arch Chemicals, Inc (Atlanta, Ga).

Exemplary co-solvents and plasticizers include ethylene glycol, propylene glycol, diethylene glycol, and combinations thereof.

Other suitable additives that can optionally be incorporated into the composition include rheology modifiers, wetting and spreading agents, leveling agents, conductivity additives, adhesion promoters, anti-blocking agents, anti-cratering agents and anti-crawling agents, anti-freezing agents, corrosion inhibitors, anti-static agents, flame retardants and intumescent additives, dyes, optical brighteners and fluorescent additives, UV absorbers and light stabilizers, chelating agents, cleanability additives, crosslinking agents, flatting agents, flocculants, humectants, insecticides, lubricants, odorants, oils, waxes and slip aids, soil repellants, stain resisting agents, and combinations thereof.

The coating compositions described above can be provided as aqueous dispersions having a solids content of from 50-85% or from 60-75%. In some cases, the coating compositions described herein can be provided as powder formulations. Powder formulations of this type include an anionically stabilized copolymer, a derivatized polyamine, and optionally one or more additives (e.g., pigments, fillers, and/or spray-drying aids) as described above. The powder formulations can be reconstituted prior to use, for example, by addition of water, one or more volatile bases, and optionally one or more co-solvents, to provide the aqueous coating compositions described above.

Also provided are coatings formed from the coating compositions described herein, as well as methods of forming these coatings. Generally, coatings are formed by applying a coating composition described herein to a surface, and allowing the coating to dry to form a coating. The resultant dry coatings typically comprise, at minimum, an anionically stabilized polymer and a derivatized polyamine. The dry coatings can further comprise one or more additives (e.g., pigments and/or fillers) as described above.

Coating compositions can be applied to a surface by any suitable coating technique, including spraying, rolling, brushing, or spreading. Coating compositions can be applied in a single coat, or in multiple sequential coats (e.g., in two coats or in three coats) as required for a particular application. Generally, the coating composition is allowed to dry under ambient conditions. However, in certain embodiments, the coating composition can be dried, for example, by heating and/or by circulating air over the coating.

The coating can be co-applied with a setting accelerator to decrease the setting time of the coating on a surface. Suitable setting accelerators include compounds, such as acids, which consume the volatile base and decrease coating setting time. For example, the setting accelerator can be a dilute acid, such as acetic acid or citric acid. Setting accelerators can be applied to a surface prior to coating application, applied simultaneously with the coating composition, or applied to the coating after it has been applied to a surface but prior to drying.

Coating thickness can vary depending upon the application of the coating. For example, the coating can have a dry thickness of at least 10 mils (e.g., at least 15 mils, at least 20 mils, at least 25 mils, at least 30 mils, or at least 40 mils). In some instances, the coating has a dry thickness of less than 100 mils (e.g., less than 90 mils, less than 80 mils, less than 75 mils, less than 60 mils, less than 50 mils, less than 40 mils, less than 35 mils, or less than 30 mils). In some embodiments, the coating has a dry thickness of between 10 mils and 100 mils. In certain embodiments, the coating has a dry thickness of between 10 mils and 40 mils.

The elongation at break of the coatings described herein can be measured according to ASTM D-2370. Generally, the coatings display an elongation at break after a drying period of at least 14 days, as measured according to ASTM D-2370 of at least 90% (e.g., at least 95%, at least 100%, at least 110%, at least 120%, at least 130%, at least 140%, at least 150%, at least 160%, at least 170%, at least 180%, at least 190%, or at least 200%). In some embodiments, the coatings display an elongation at break after 1,000 of accelerated weathering, as measured according to ASTM D-2370 of at least 90% (e.g., at least 95%, at least 100%, at least 110%, at least 120%, at least 130%, at least 140%, at least 150%, at least 160%, at least 170%, at least 180%, at least 190%, or at least 200%).

The tensile strength of the coatings described herein can be measured according to ASTM D-2370. Generally, the coatings display tensile after a drying period of at least 14 days, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi). In some embodiments, the coatings display tensile strength after 1,000 of accelerated weathering, as measured according to ASTM D-2370 of at least 140 psi (e.g., at least 150 psi, at least 160 psi, at least 170 psi, at least 180 psi, at least 190 psi, at least 200 psi, at least 210 psi, at least 220 psi, or at least 225 psi)

The coating compositions can be applied to a variety of surfaces including, but not limited to metal, asphalt, concrete, stone, ceramic, wood, plastic, polyurethane foam, glass, and combinations thereof.

The coating compositions can be applied to interior or exterior surfaces. In certain embodiments, the surface is an architectural surface, such as a roof, wall, floor, or combination thereof. The architectural surface can be located above ground, below ground, or combinations thereof.

In some cases, the coating is applied to a surface to form a barrier against moisture. For example, coatings can be applied to a roof or wall to prevent or seal a water leak. The coating can be applied to a foundation, wall, or roof as a water proofing composition to prevent water penetration (e.g., to form an elastomeric weatherproofing membrane). In some instances, the coating is applied to a surface in combination with a conventional weatherproofing membrane. The coating can also be applied as part of an exterior insulating and finishing system (EIFS).

In certain embodiments, the coating is applied to a surface to reflect solar radiation. In these cases, the coating will generally contain one or more pigments that reflect solar energy, such as titanium dioxide. By reflecting the sun's heat, the coating can help to cool a surface. In the case of coatings applied to architectural surfaces such as roofs, the roof coating can help to reduce a building's interior temperatures and cooling costs.

In some embodiments, the coating is applied to a road surface as a traffic paint. In these embodiments, the road surface can be, for example, asphalt or concrete. In some cases when the coating is applied as a traffic paint, the coating contains a filler such as a reflective filler.

In certain embodiments, the coating is an elastomeric roof coating. In certain embodiments, the coating will generally satisfy the requirements of ASTM D6083-05, entitled "Standard Specification for Liquid Applied Acrylic Coating Used in Roofing". In particular embodiments, the coating has a tensile strength of greater than 200 psi, and an elongation at break of greater than 100%, according to ASTM D-2370, after 1,000 hours of accelerated weathering.

Also provided are methods of decreasing the setting time of conventional acrylic elastomeric roof coating compositions comprising adding a derivatized polyamine, such as an alkoxylated polyamine, to the elastomeric roof coating composition. In these embodiments, the derivatized polyamine is generally added in an amount as described herein, for example, between greater than 0% by weight and 10% by weight, based on the weight of the elastomeric components in the roof coating composition. These compositions can then be applied to a surface, and allowed to dry ask described above.

Derivatized polyamines can also be incorporated as setting agents in other types of compositions which contain anionically stabilized copolymers. In particular, derivatized polyamines may be utilized to decrease the setting time of other compositions where fast setting and/or rain resistance are desirable. For example, derivatized polyamines can be added to conventional adhesives (e.g., construction adhesives), grouts, caulks, sealants, and exterior insulating and finishing systems (EIFS) to decrease setting time.

By way of non-limiting illustration, examples of certain embodiments of the present disclosure are given below.

EXAMPLES

Example 1

Compositions Containing a Polyethyleneimine Setting Agent

Elastomeric coatings containing an anionically stabilized acrylic-based copolymer ($T_g$=−32° C.) and two different polyethyleneimines (PEI-1, MW=1,300 Daltons; PEI-2, MW=2,000 Daltons) were prepared as described below.

For a 600 g coating composition, the following ingredients were mixed:

37 g water, 2.4 g Pigment Disperser N (BASF), 2.0 g propylene glycol, 2.4 g BYK 035 defoamer (BYK), 1.0 g Lutensol TDA 8 (BASF), 60.7 g Kronos 2310 (Kronos, Inc.), 43.0 g OMYACARB UFT-FL (Omya), 32.2 g ATOMITE (Imerys), 118.4 DURAMITE (Imerys), and 1.2 PROXEL DB20 biocide (Arch Chem.) were mixed until homogeneous.

Then the following materials were subsequently added: 230 g aqueous polymer emulsion, 46 g water, about 2 g 29% ammonia, or more to get to pH 10, the appropriate amount of polyethyleneimine or other setting agent, 5.0 g BYK 035 defoamer (BYK), and finally a pre-mixed slurry of 2.5 g NATROSOL 250 MXR (Ashland) in 100 g propylene glycol.

Simulated Rain Resistance of the Coatings

The formulations were applied as a 30 mil thick coating on black lanetta paper using a PGT Co. #2 draw down well. Immediately after the coating is drawn down, a timer set for 20 minutes was started. As the end of 20 minutes approaches, the coated panel is placed on a stand that holds it at a 45° angle. A burette is setup directly above the panel. The tip of the burette is set at a distance of 10 inches from the panel surface. After a drying time of 20 minutes, DI water is dripped onto the coated panel. A total of 5 ml of DI water is dripped onto the panel over roughly 1 minute. The coating is tested at 20 minute intervals for up to two hours. At the end of two hours, the integrity of the coating at each time interval is evaluated visually on a scale from 0 to 100%. Zero percent would indicate no resistance to the water while one hundred percent indicates no marring of the coating's surface as well as no runoff of the coating. A set time is then established for the sample based upon a rating of 100%.

Measurement of Film Tensile Strength and Film Elongation at Break

After a drying period of fourteen days, the film tensile strength and film elongation at break were measured according to ASTM D-6083.

TABLE 1

Performance of Compositions Containing a Polyethyleneimine Setting Agent

| Binder System | Film Tensile Strength (psi) | Film Elongation at Break (%) | 20 Minutes Drying Time | 40 Minutes Drying Time | Film appearance after weathering[a] |
|---|---|---|---|---|---|
| Acrylic | 145 | 200 | Severe damage/wash-off | Severe damage/wash-off | White |
| Acrylic + 1% PEI-1 | 208 | 119 | Severe damage/wash-off | Severe damage/wash-off | Severe yellowing |
| Acrylic + 2% PEI-1 | 216 | 88 | Little damage/no wash-off | No damage/no wash-off | Severe yellowing |
| Acrylic + 1% PEI-2 | 224 | 116 | Severe damage/wash-off | Severe damage/wash-off | Severe yellowing |
| Acrylic + 2% PEI-2 | 260 | 74 | Almost no damage/no wash-off | No damage/no wash-off | Severe yellowing |

PEI-1: MW = 1,300 Daltons;
PEI-2: MW = 2,000 Daltons
[a]After 1,000 h accelerated weathering.

Results

The film tensile strength, elongation at break, and simulated rain resistance of coatings formed from coating compositions containing an anionically stabilized acrylic-based copolymer ($T_g$=−32° C.) and two different polyethyleneimines (PEI-1, MW=1,300 Daltons; PEI-2, MW=2,000 Daltons) are shown in Table 1.

As shown in Table 1, the composition containing an anionically stabilized acrylic-based copolymer and no PEI exhibited no resistance to wash-off after 40 minutes. The addition of PEI improved the damage- and wash-off resistance of the coatings, with compositions containing 2% PEI exhibiting no damage and no wash-off after 40 minutes. However, the addition of PEI significantly reduced film elongation at break, with compositions containing 2% PEI exhibiting film elongation at break values of less than 100%. Moreover, all compositions containing PEI displayed severe yellowing after accelerated weathering.

Example 2

Compositions Containing an Alkoxylated Polyethyleneimine (APEI) Setting Agent Elastomeric coatings containing one of two different anionically stabilized acrylic-based copolymers (Acrylic-1: $T_g$=−32° C.; Acrylic-2: $T_g$=−28° C.) and an ethoxylated polyethyleneimine were prepared as described below.

For a 600 g coating composition, the following ingredients were mixed:

37 g water, 2.4 g Pigment Disperser N (BASF), 2.0 g propylene glycol, 2.4 g BYK 035 defoamer (BYK), 1.0 g Lutensol TDA 8 (BASF), 60.7 g Kronos 2310 (Kronos, Inc.), 43.0 g OMYACARB UFT-FL (Omya), 32.2 g ATOMITE (Imerys), 118.4 DURAMITE (Imerys), and 1.2 PROXEL DB20 biocide (Arch Chem.) were mixed until homogeneous.

Then the following materials were subsequently added: 230 g aqueous polymer emulsion, 46 g water, about 2 g 29% ammonia, or more to get to pH 10, the appropriate amount of polyethyleneimine or other setting agent, 5.0 g BYK 035 defoamer (BYK), and finally a pre-mixed slurry of 2.5 g NATROSOL 250 MXR (Ashland) in 100 g propylene glycol.

The film tensile strength, elongation at break, and simulated rain resistance of coatings formed from these coating compositions were measured, as described above in Example 1.

TABLE 2

Performance of Compositions Containing an Alkoxylated Polyethyleneimine Setting Agent

| Binder System | Film Tensile Strength (psi) | Film Elongation at Break (%) | 20 Minutes Drying Time | 40 Minutes Drying Time | Film appearance after weathering[a] |
|---|---|---|---|---|---|
| Acrylic-1 | 151 | 179 | Severe damage/wash-off | Severe damage/wash-off | White |
| Acrylic-1 + 0.5% APEI | 148 | 201 | Severe damage/wash-off | Partial damage/some wash-off | Very slightly yellow |
| Acrylic-1 + 1.0% APEI | 154 | 228 | Little damage/no wash-off | No damage/no wash-off | Very slightly yellow |
| Acrylic-2 | 213 | 208 | Severe damage/wash-off | Severe damage/wash-off | White |
| Acrylic-2 + 0.5% APEI | 204 | 235 | Partial damage/some wash-off | No damage/no wash-off | Very slightly yellow |
| Acrylic-2 + 1.0% APEI | 187 | 259 | No damage/no wash-off | No damage/no wash-off | Very slightly yellow |

Acrylic-1: $T_g = -32°$ C.;
Acrylic-2: $T_g = -28°$ C.;
APEI: MW = 110,000 Daltons,
Degree of Ethoxylation = 80%
[a] After 1,000 h accelerated weathering.

Results

The film tensile strength, elongation at break, and simulated rain resistance of coatings formed from coating compositions containing one of two different anionically stabilized acrylic-based copolymer (Acrylic-1: $T_g=-32°$ C.; Acrylic-2: $T_g=-28°$ C.) and an ethoxylated polyethyleneimine (APEI) are shown in Table 2.

As shown in Table 2, compositions containing an anionically stabilized acrylic-based copolymer and no APEI exhibited no resistance to wash-off after 40 minutes. The addition of APEI improved the damage- and wash-off resistance of the coatings, with compositions containing 1% APEI exhibiting no damage and no wash-off after 40 minutes. In addition, the addition of APEI enhanced the film elongation at break, with compositions containing 1% APEI exhibiting greater than 200% elongation at break. Moreover, all compositions containing APEI did not exhibit yellowing after accelerated weathering.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An aqueous composition comprising:
   (a) an anionically stabilized copolymer derived from greater than 65% by weight of one or more (meth) acrylate monomers and has a Tg of between −50° C. and 0° C., wherein the anionically stabilized copolymer comprises
      (i) 10-15% by weight methyl methacrylate;
      (ii) 50-70% by weight butyl acrylate;
      (iii) 15-30% by weight 2-ethylhexylacrylate;
      (iv) greater than 0 to 5% by weight carboxylic acid-containing monomers;
      (v) 0-5% by weight acrylamide; and
      (vi) 0-5% by weight acetoacetoxy monomers,
   and wherein the anionically stabilized copolymer is further derived from greater than 0% by weight to 35% by weight of one or more additional ethylenically-unsaturated monomers, wherein the one or more additional ethylenically-unsaturated monomers include a vinyl aromatic monomer having up to 20 carbon atoms and wherein the anionically stabilized copolymer does not include a phosphorus-containing monomer;
   (b) a derivatized polyamine in an amount of from greater than 0% to 8% by weight, based on the dry weight of the anionically stabilized polymer; and (c) a volatile base;
  wherein the derivatized polyamine has a degree of nitrogen-derivatization of at least 10%.

2. The composition of claim 1, wherein the derivatized polyamine is a derivatized polyalkylene imine or derivatized polyvinylamine which has a degree of nitrogen-derivatization between 70% and 90%.

3. The composition of claim 1, wherein the derivatized polyamine is a derivatized polyalkylene imine or derivatized polyvinylamine which comprises alkoxylated polyethyleneimine (PEI).

4. The composition of claim 1, wherein the composition includes derivatized polyvinylamine.

5. The composition of claim 1, wherein the derivatized polyamine is a derivatized polyalkylene imine or derivatized polyvinylamine which is present in the composition at between 0.1% by weight and 5% by weight, based on the dry weight of the anionically stabilized copolymer.

6. The composition of claim 1, wherein the anionically stabilized copolymer includes an acrylic-based copolymer, wherein the acrylic-based copolymer is derived from greater than 90% by weight of one or more (meth)acrylate monomers.

7. The composition of claim 6, wherein the one or more (meth)acrylate monomers are selected from the group consisting of methyl methacrylate, butyl acrylate, 2-ethylhexylacrylate, and combinations thereof.

8. The composition of claim 1, wherein the anionically stabilized copolymer is derived from 10% by weight to 30% by weight of a vinyl aromatic monomer having up to 20 carbon atoms.

9. The composition of claim 1, wherein derivatized polyamine is a derivatized polyalkylene imine or derivatized polyvinylamine which is present in an amount of from 0.05% to 5% by weight, based on the dry weight of the anionically stabilized polymer.

10. The composition of claim 1, wherein the anionically stabilized copolymer has a Tg of from −50° C. to less than −10° C.

11. A method of producing a coating on a surface comprising
  (a) applying to the surface an aqueous coating composition defined by claim 1; and
  (b) allowing the composition to dry to produce the coating,
wherein the surface is an architectural surface or a roof.

12. The method of claim 11, further comprising applying a setting accelerator.

13. An aqueous composition comprising:
(a) an anionically stabilized copolymer derived from
  (i) 55-75% by weight butyl acrylate;
  (ii) 0-25% by weight 2-ethylhexylacrylate;
  (iii) greater than 0% to 35% by weight of one or more additional ethylenically-unsaturated monomers, wherein said one or more additional ethylenically-unsaturated monomers are selected from the group consisting of a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, and a combination of these monomers;
  (iv) greater than 0 to 5% by weight carboxylic acid-containing monomers;
  (v) 0-5% by weight acrylamide; and
  (vi) 0-5% by weight acetoacetoxy monomers and has a Tg of between −50° C. and −10° C.,
wherein the anionically stabilized copolymer does not include a phosphorus-containing monomer;
  (b) a derivatized polyamine in an amount of from greater than 0% to 5% by weight, based on the dry weight of the anionically stabilized polymer, wherein the derivatized polyamine is selected from a derivatized polyalkylene imine or a derivatized polyvinylamine; and
  (c) a volatile base; wherein the derivatized polyamine has a degree of nitrogen-derivatization of at least 10%.

14. An aqueous composition comprising:
(a) an anionically stabilized copolymer derived from greater than 65% by weight of one or more (meth)acrylate monomers and has a Tg of between −70° C. and 25° C., wherein the anionically stabilized copolymer comprises
  (i) 55-75% by weight butyl acrylate;
  (ii) 0-25% by weight 2-ethylhexylacrylate;
  (iii) greater than 0% to 35% by weight of one or more additional ethylenically-unsaturated monomers, wherein said one or more additional ethylenically-unsaturated monomers are selected from the group consisting of a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, and a combination of these monomers;
  (iv) greater than 0 to 5% by weight carboxylic acid-containing monomers;
  (v) 0-5% by weight acrylamide; and
  (vi) 0-5% by weight acetoacetoxy monomers, wherein the anionically stabilized copolymer and does not include a phosphorus-containing monomer;
  (b) a derivatized polyamine in an amount of from greater than 0% to 8% by weight, based on the dry weight of the anionically stabilized polymer; and
  (c) a volatile base;
wherein the derivatized polyamine has a degree of nitrogen-derivatization of at least 10%.

15. The composition of claim 13, wherein said one or more additional ethylenically-unsaturated monomers are styrene, α- and p-methylstyrene, α-butylstyrene, 4-n-butylstyrene, 4-n-decylstyrene, vinyltoluene, and combinations thereof.

16. The composition of claim 13, wherein said component (iii) is 10-35% by weight styrene.

17. The composition of claim 14, wherein said one or more additional ethylenically-unsaturated monomers are styrene, α- and p-methylstyrene, α-butylstyrene, 4-n-butylstyrene, 4-n-decylstyrene, vinyltoluene, and combinations thereof.

18. The composition of claim 14, wherein said component (iii) is 10-35% by weight styrene.

19. The composition of claim 1, wherein the anionically stabilized copolymer is derived from 10-35% by weight styrene.

20. The composition of claim 5, wherein the derivative derivatized polyamine is in an amount of from greater than 0% to 5% by weight and the derivatized polyamine is derivatized polyalkylene imine or a derivatized polyvinylamine and has a degree of nitrogen-derivatization of at least 35%.

21. The composition of claim 1, wherein the derivatized polyamine is derivatized polyalkylene imine or a derivatized polyvinylamine and has a degree of nitrogen-derivatization of at least 40%.

22. The composition of claim 13, wherein the derivatized polyamine is in an amount of from greater than 0% to 5% by weight and the derivatized polyamine is derivatized polyalkylene imine or a derivatized polyvinylamine-and has a degree of nitrogen-derivatization of at least 35%.

23. The composition of claim 14, wherein the derivatized polyamine is in an amount of from greater than 0% to 5% by weight and the derivatized polyamine is derivatized polyalkylene imine or a derivatized polyvinylamine and has a degree of nitrogen-derivatization of at least 35%.

24. The composition of claim 14, wherein the anionically stabilized copolymer derived from greater than 65% by weight of one or more (meth)acrylate monomers and has a Tg of between −50° C. and 0° C.

* * * * *